US012632624B1

(12) United States Patent
Rütermann-Franz et al.

(10) Patent No.: US 12,632,624 B1
(45) Date of Patent: May 19, 2026

(54) SENSOR EVENT BASED ACTIVITY HOUR MODELLING

(71) Applicant: CrowdStrike, Inc., Sunnyvale, CA (US)

(72) Inventors: Tim Rütermann-Franz, Bamberg (DE); Cullen Boldt, Madrid (ES); Ori Zuckerman, Nir Banim (IL)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 19/032,953

(22) Filed: Jan. 21, 2025

(51) Int. Cl.
| | |
|---|---|
| *G06F 30/27* | (2020.01) |
| *G06F 17/17* | (2006.01) |
| *G06F 17/18* | (2006.01) |
| *G06F 18/24* | (2023.01) |
| *G06F 21/55* | (2013.01) |

(52) U.S. Cl.
CPC .............. *G06F 30/27* (2020.01); *G06F 17/17* (2013.01); *G06F 17/18* (2013.01); *G06F 18/24* (2023.01); *G06F 21/552* (2013.01)

(58) Field of Classification Search
None
See application file for complete search history.

(56) References Cited

U.S. PATENT DOCUMENTS

| | | | | |
|---|---|---|---|---|
| 5,479,574 A | * | 12/1995 | Glier ....................... | G06N 3/063 706/25 |
| 9,053,416 B1 | * | 6/2015 | De Leo ............... | H04L 67/1057 |

| | | | | |
|---|---|---|---|---|
| 10,452,841 B1 | * | 10/2019 | Tamersoy ............. | G06F 21/552 |
| 10,686,829 B2 | * | 6/2020 | Amit ...................... | G06F 21/552 |
| 10,992,699 B1 | * | 4/2021 | Sites ...................... | G06N 20/20 |
| 11,481,709 B1 | * | 10/2022 | Liao ................... | G06Q 10/0635 |
| 11,836,587 B2 | * | 12/2023 | Skogstad ............... | G06N 20/00 |
| 12,023,149 B2 | * | 7/2024 | Taghvaeeyan ......... | G16H 50/30 |
| 12,099,515 B1 | * | 9/2024 | Azam ................. | G06F 16/2477 |
| 12,299,563 B2 | * | 5/2025 | Faith ...................... | G06N 3/045 |

(Continued)

FOREIGN PATENT DOCUMENTS

| | | | |
|---|---|---|---|
| CN | 113506023 A | * | 10/2021 |

OTHER PUBLICATIONS

Rapid7, Logs To Understand User Activity and Behavior, Dec. 29, 2016, Updated Feb. 1, 2024, 11 pages [online], [retrieved on Oct. 31, 2024]. Retrieved from the internet <https://www.rapid7.com/blog/post/2016/12/29/logs-to-understand-user-activity-and-behavior/>.

(Continued)

*Primary Examiner* — Akash Saxena
(74) *Attorney, Agent, or Firm* — Womble Bond Dickinson (US) LLP

(57) ABSTRACT

The present disclosure provides techniques for sensor event based activity hour modelling. A processing device obtains, via a sensor application installed on a user device, a plurality of events occurring on the user device, where each event in the plurality of events includes a respective day and a respective time. The processing device aggregates, based on the respective day and the respective time, the plurality of events to generate time series data. The processing device performs a smoothing operation on the time series data to (Continued)

generate a curve. The processing device classifies an event on the user device as usual or unusual based on a baseline level of activity on the user device and the curve.

20 Claims, 6 Drawing Sheets

(56) References Cited

U.S. PATENT DOCUMENTS

| | | | | |
|---|---|---|---|---|
| 2009/0043525 A1* | 2/2009 | Brauker | .............. | A61M 5/1723 |
| | | | | 702/179 |
| 2010/0063773 A1* | 3/2010 | Marvasti | ........... | G05B 23/0221 |
| | | | | 702/179 |
| 2016/0321616 A1* | 11/2016 | Gedge | .................... | G06N 5/025 |
| 2018/0165583 A1 | 6/2018 | Guiver et al. | | |
| 2018/0167402 A1* | 6/2018 | Scheidler | ............... | G06N 20/00 |
| 2018/0247215 A1* | 8/2018 | Garvey | ................. | G06N 20/00 |
| 2019/0007429 A1* | 1/2019 | Erinle | ................ | H04L 63/1425 |
| 2019/0124488 A1* | 4/2019 | Ellis | .................... | G06F 13/1668 |
| 2019/0147300 A1* | 5/2019 | Bathen | ............... | G06F 18/2433 |
| | | | | 706/12 |
| 2021/0035011 A1* | 2/2021 | Arnold | ............... | G06F 11/3006 |
| 2021/0126938 A1* | 4/2021 | Trost | .................... | G06F 21/552 |
| 2022/0188209 A1* | 6/2022 | Togawa | ................ | G06F 11/076 |
| 2022/0342861 A1* | 10/2022 | Gonzalez Macias | ........................ | |
| | | | | G06F 16/24568 |
| 2022/0360596 A1* | 11/2022 | Varnavas | ................ | G06F 21/50 |
| 2023/0388332 A1 | 11/2023 | Cunningham et al. | | |
| 2024/0137777 A1* | 4/2024 | He | ........................ | G06F 18/211 |

OTHER PUBLICATIONS

Pryimenko, Liudmyla, Syteca, 5 Levels of User Behavior Monitoring and Analytics, Dec. 13, 2023, 17 pages [online], [retrieved on Oct. 31, 2024]. Retrieved from the internet <https://www.syteca.com/en/blog/5-levels-user-behavior-monitoring>.

Koppelman, Lauren, Next DLP, What is User Entity and Behavior Analytics (UEBA)?, Feb. 8, 2024, 23 pages [online], [retrieved on Nov. 4, 2024]. Retrieved from the internet <https://www.nextdlp.com/resources/blog/what-is-user-entity-and-behavior-analytics-ueba>.

Yuan, Lun-Pin et al., Time-Window Based Group-Behavior Supported Method for Accurate Detection of Anomalous Users, pp. 1-13.

Wojtasiak, Mark, Code42 Software, The Incydr Scoop: Quantifying & Elevating Insider Risk Signals Through Incydr Product Telemetry Data, Jan. 4, 2021, 7 pages.

* cited by examiner

300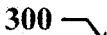

302

Obtain, via a sensor application installed on a user device, a plurality of events occurring on the user device, where each event in the plurality of events indicates a respective day and a respective time

304

Aggregate, based on the respective day and the respective time, the plurality of events to generate time series data

306

Perform a smoothing operation on the time series data to generate a curve

308

Classify an event on the user device as usual or unusual based on a baseline level of activity on the user device and the curve

FIG. 3

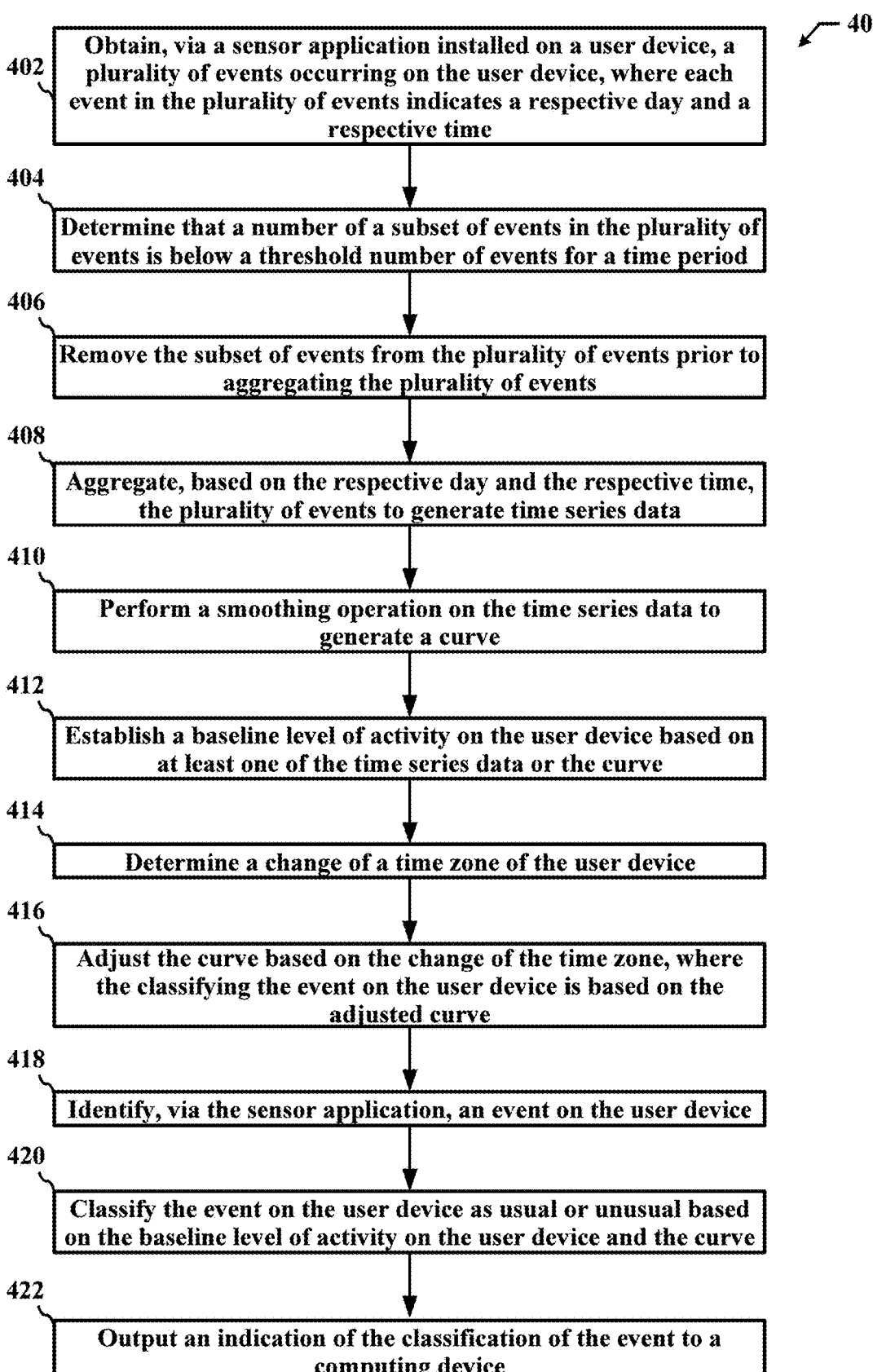

402 — Obtain, via a sensor application installed on a user device, a plurality of events occurring on the user device, where each event in the plurality of events indicates a respective day and a respective time 404 — Determine that a number of a subset of events in the plurality of events is below a threshold number of events for a time period 406 — Remove the subset of events from the plurality of events prior to aggregating the plurality of events 408 — Aggregate, based on the respective day and the respective time, the plurality of events to generate time series data 410 — Perform a smoothing operation on the time series data to generate a curve 412 — Establish a baseline level of activity on the user device based on at least one of the time series data or the curve 414 — Determine a change of a time zone of the user device 416 — Adjust the curve based on the change of the time zone, where the classifying the event on the user device is based on the adjusted curve 418 — Identify, via the sensor application, an event on the user device 420 — Classify the event on the user device as usual or unusual based on the baseline level of activity on the user device and the curve 422 — Output an indication of the classification of the event to a computing device

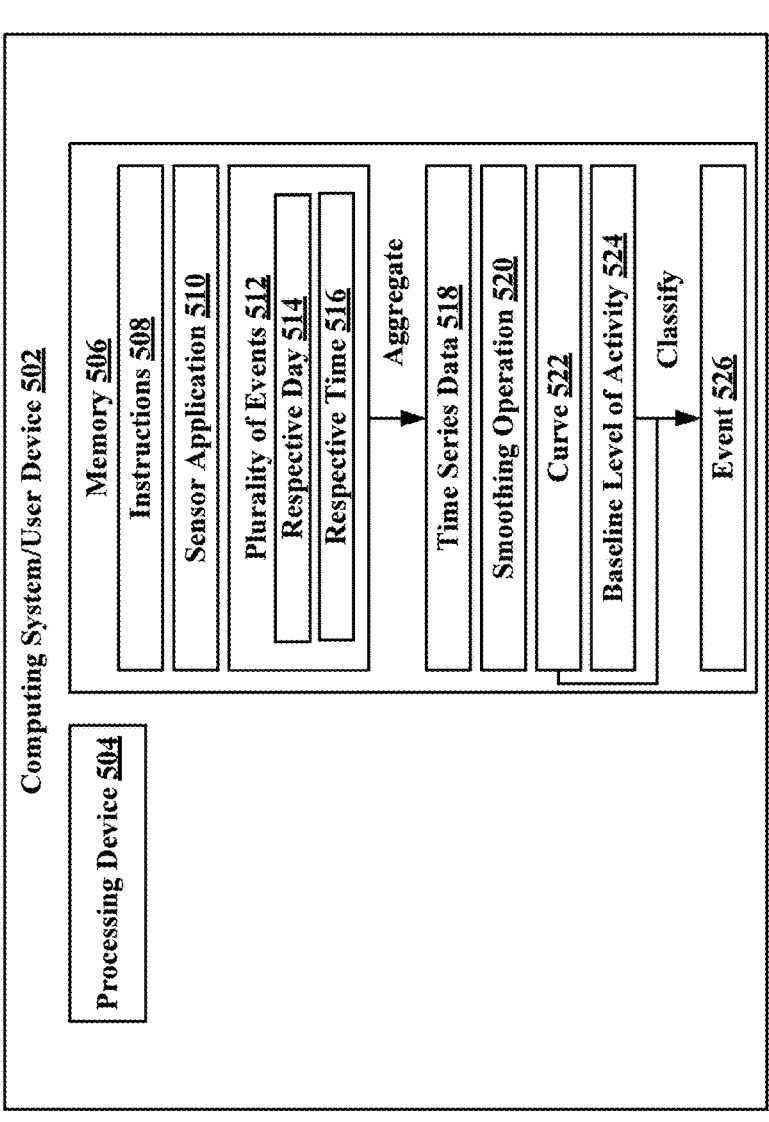
FIG. 5

SENSOR EVENT BASED ACTIVITY HOUR MODELLING

TECHNICAL FIELD

Aspects of the present disclosure relate to cybersecurity, and more particularly, to sensor event based activity hour modelling.

BACKGROUND

Cybersecurity refers to the practice of protecting computer systems, networks, and digital assets from theft, damage, unauthorized access, and various forms of cyber threats. Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a flow diagram of a method of sensor event based activity hour modelling in accordance with some aspects of the present disclosure.

FIG. 4 is a flow diagram of a method of sensor event based activity hour modelling in accordance with some aspects of the present disclosure.

FIG. 5 is a block diagram that illustrates an example of a system for sensor event based activity hour modelling in accordance with some aspects of the present disclosure.

DETAILED DESCRIPTION

Figure 1:
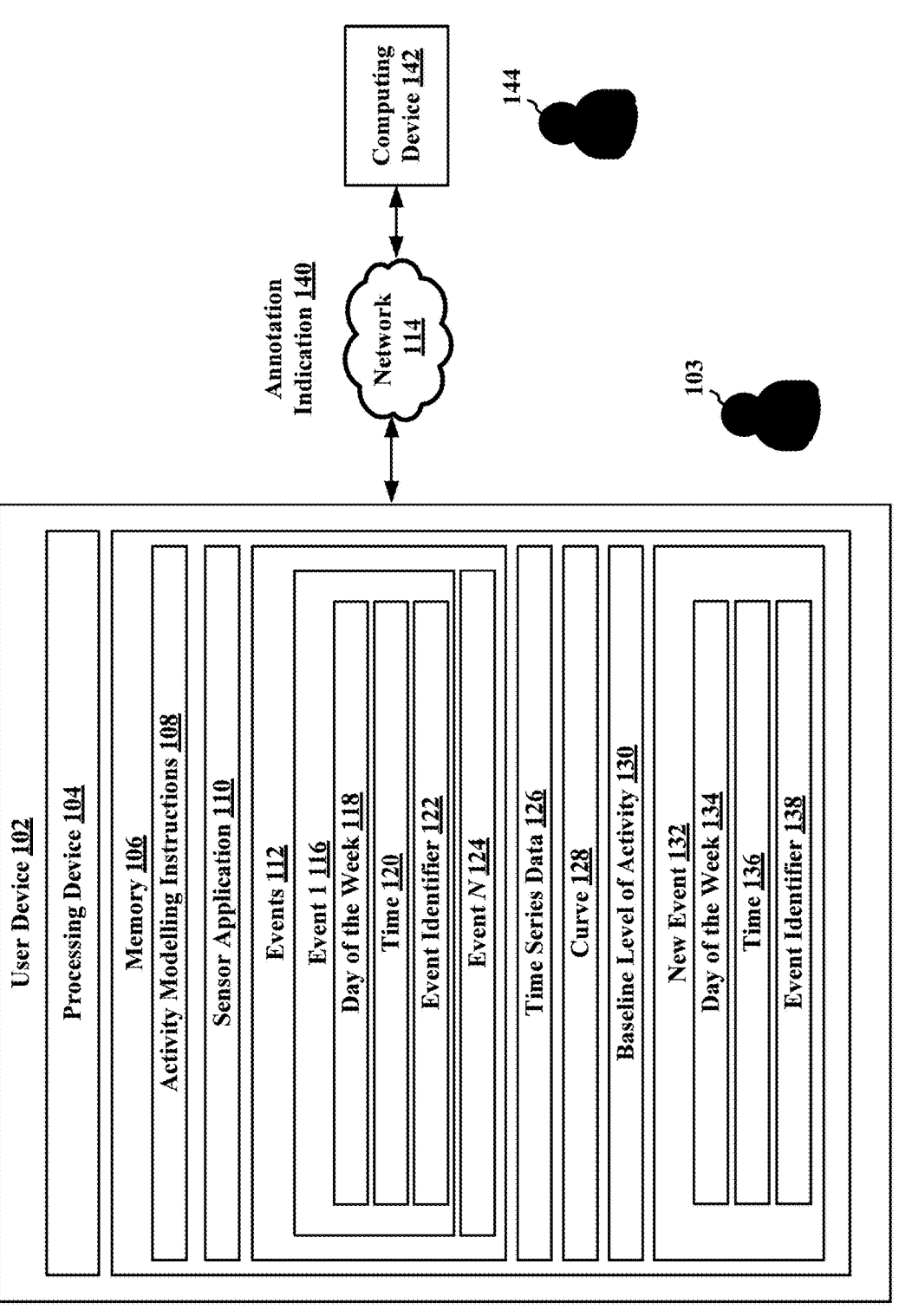
FIG. 1 is a block diagram that illustrates an example of a system for sensor event based activity hour modelling in accordance with some aspects of the present disclosure.

Data egress may refer to a process of data leaving a device, an application, a system, and/or a network and the data being transferred to another location (e.g., another device, another application, another system, and/or another network). Data egress may pose a security risk to an organization if the data egress is unauthorized by the organization. For instance, a malicious actor may gain access to a device of an organization, access sensitive data of the organization, and transfer the sensitive data to a device (e.g., a universal serial bus (USB) drive) of the malicious actor. Data egress cybersecurity may refer to a process of monitoring and controlling a flow of data (e.g., sensitive data) out of a device, an application, a system, and/or a network to prevent unauthorized access to the data.

Various indicators exist that may indicate unauthorized data egress. One such indicator may be whether or not data egress (or attempted data egress) occurs during regular working hours (e.g., normal working hours) of a user (e.g., an employee). For example, data egress that occurs outside of regular working hours of the user may be indicative of unauthorized data egress, whereas data egress that occurs during the regular working hours of the user may be indicative of authorized data egress.

Some data egress cybersecurity models may be based on manually configured and/or manually defined working hours of users. For example, an organization (e.g., a company) may define regular working hours (e.g., 9:00 PM-5:00 PM) for the organization, a team of users within the organization, or a project of the organization). Other data egress cybersecurity models may define regular working hours based on time zone based assumptions (e.g., region specific assumptions). Some other data egress cybersecurity models may rely upon enterprise resource planning (ERP) integration in order to define regular working hours of users. ERP integration may refer to software used by an organization to manage day-to-day activities such as accounting, procurement, project management, compliance, and supply chain operations. The aforementioned data egress cybersecurity models may suffer from various deficiencies. For instance, manually configured/defined working hours may be static and may not account for individual activity behavior of users. Manually configured/defined working hours may entail regular maintenance of user records and may struggle to adapt to common changes in activity patterns, such as changes in work intensity (e.g., phases in a project life cycle, quarterly trends, etc.), a user relocating to a new time zone, part time work, flexible working hours, personal matters, etc. If a data egress cybersecurity model is not configured with a proper definition of regular working hours, the data egress cybersecurity model may not generate accurate predictions as to whether or not unauthorized data egress is occurring. Furthermore, integrating an ERP application with a data egress cybersecurity model may be associated with computational overhead.

The present disclosure addresses the above-noted and other deficiencies by using a processing device for sensor event based activity hour modelling. The processing device may obtain/generate/collect events (e.g., disk reads/writes) that occur on a user device. The processing device may aggregate the events into a day-hour format to generate time series data. For instance, the processing device may determine a number of events that occur for each possible day-hour format (e.g., a number of events for Tuesday occurring between 1:00-1:59 PM, a number of events for Tuesday occurring between 2:00-2:59 PM, etc.). The processing device may perform various transformations (e.g., smoothing) on the time series data to generate a curve over each hour of each day of a week. The processing device may also establish a baseline level of activity for user device (and hence the user). The baseline level of activity for the user device may be configurable by an organization associated with the user device. A combination of the curve and the baseline level of activity for the user device may be used to determine whether a new event is usual or unusual for the user device. For instance, the processing device may determine a day and an hour of the new event. The processing device may then identify a point on the curve corresponding to the day and the hour of the new event. The processing device may compare the point to the baseline level of activity. If the point is above the baseline level of activity, the processing device may classify the new event as usual.

If the point is at or below the baseline level of user activity, the processing device may classify the event as unusual and surface an indication to a security analyst. The security analyst may then investigate as to whether unauthorized data egress occurred with respect to the new event.

In an example, a processing device obtains, via a sensor application installed on a user device, a plurality of events occurring on the user device, where each event in the plurality of events indicates a respective day and a respective time. The processing device aggregates, based on the respective day and the respective time, the plurality of events to generate time series data. The processing device performs a smoothing operation on the time series data to generate a curve. The processing device classifies an event on the user device as usual or unusual based on a baseline level of activity on the user device and the curve.

As discussed herein, the present disclosure provides an approach that improves the operation of a computer system by implementing a flexible data egress detection scheme that does not rely upon ERP integration and that does not rely upon manually configured rules. Vis-à-vis classifying an event on the user device as usual or unusual based on a baseline level of activity on the user device and the curve, the present disclosure may reduce use of computing resources (e.g., processor clock cycles, memory, etc.) associated with surfacing false positive detections of data egress events and reduce computing resources associated with manual configuration and reconfiguration of normal employee working hours. In addition, the present disclosure provides an improvement to the technological field of cybersecurity by reducing a frequency of false positive detections with respect to events (e.g., data egress events). Furthermore, in some aspects, the present disclosure may raise a detection of a potential unauthorized data egress event without indicating how active a given user is in general, thus preserving user privacy.

FIG. 1 is a block diagram 100 that illustrates an example of a system for sensor event based activity hour modelling in accordance with some aspects of the present disclosure. The system includes a user device 102. In an example, the user device 102 may be or include the computing system/ user device 502 (or a portion thereof) and/or the computer system 600 (or a portion thereof). In an example, the user device 102 may be or include a desktop computing device, a laptop computing device, a tablet computing device, a smartphone, a wearable computing device, an extended reality (XR) computing device, a gaming console, etc. The user device 102 may be operated by a user 103. In an example, the user device 102 may be work device issued to the user 103 by an organization (e.g., a company) associated with the user 103.

The user device 102 includes a processing device 104 and memory 106. The memory 106 stores activity modelling instructions 108 that, when executed by the processing device 104, causes the processing device 104 to perform sensor event based activity hour modelling as described herein. The memory 106 stores a sensor application 110. The sensor application 110, when executed by the processing device 104, causes the processing device 104 to obtain (e.g., monitor/collect/receive/create/generate) events 112 that occur with respect to (e.g., on) the user device 102. The user device 102 may store the events 112 in the memory 106 (and/or in other data storage). In an example, the events 112 may include reading data from data storage (not shown in FIG. 1), writing data to the data storage, receiving data over a network 114 (e.g., the Internet, a local area network (LAN), a wireless local area network (WLAN), etc.), transmitting data over the network 114, opening an application on the user device 102, moving a file to an external drive, etc. In some aspects, the sensor application 110 may create the events 112 based on processes occurring on and/or with respect to the user device 102. In an example, the sensor application 110 may begin to obtain the events 112 when the user device 102 is activated for the user 103, such as when the user device 102 is first issued to the user 103. In general, the sensor application 110 may obtain a relatively greater amount of events when the user device 102 is being used by the user 103 (e.g., during work hours) and the sensor application 110 may obtain a relatively fewer amount of events when the user device 102 is not being used by the user 103 (e.g., during meal breaks, during non-work hours). In some aspects, the activity modelling instructions 108 (or a portion thereof) may be included in the sensor application 110. In some aspects, the sensor application 110 (or a portion thereof) may be included in the activity modelling instructions 108.

In an example, the events 112 may include a first event 116. In an example, the first event 116 may be transmitting data over the network 114. The first event 116 includes and/or indicates a day of the week 118 (e.g., Sunday, Monday, Tuesday, Wednesday, Thursday, Friday, or Saturday) during which the first event 116 occurred. The first event 116 also includes and/or indicates a time 120 (or a time range) at which the first event 116 occurred on the day of the week 118. In an example, the day of the week 118 may be Tuesday and the time 120 may be 1:00 PM Eastern. Thus, in the aforementioned example, the first event 116 occurred on a Tuesday at 1:00 PM Eastern. In some aspects, the sensor application 110 may determine a time zone in which the user device 102 is located. In some aspects, the sensor application 110 may assign the time 120 to the first event 116 based on one of twenty-four bins, where each bin represents an hour of the day. For example, if the first event 116 occurred at 1:15 PM Eastern, the sensor application 110 may assign the time 120 of the first event 116 as 1:00 PM. In some aspects, the sensor application 110 may assign the time 120 to the event based on a different number of bins, such as forty-eight bins (i.e., half-hour bins), twelve bins (i.e., two-hour bins), etc. In some aspects, the first event 116 may include an event identifier 122 that identifies the first event 116. In the example above, the event identifier 122 may indicate that the first event 116 is transmitting data over the network 114.

The events 112 may include an Nth event 124, where N is a positive integer greater than one. The Nth event 124 may be the same as or different from the first event 116, that is, the day of the week, the time, and/or the event identifier may be the same or different in the first event 116 and the Nth event 124. For example, the first event 116 may occur on the first Tuesday of December at 1:00 PM Eastern, and the Nth event 124 may occur on the second Tuesday of December at 1:00 PM Eastern. In another example, the first event 116 may occur on the first Tuesday of December at 1:00 PM Eastern, and the Nth event 124 may occur on the first Wednesday of December at 1:00 PM Eastern. In yet another example, the first event 116 may occur on the first Tuesday of December at 1:00 PM Eastern, and the Nth event 124 may occur on the first Wednesday of December at 3:00 PM Eastern.

The user device 102 (e.g., via the activity modelling instructions 108) may aggregate the events 112 to form time series data 126. The time series data 126 may be in a day-hour format. For instance, the user device 102 may determine, from the events 112 (e.g., based on the day of the week 118 and the time 120), a number of events (i.e., an event count) that occurred for each day-hour combination (e.g., Sunday at 12:00 AM, Sunday at 1:00 AM, Sunday at 2:00 AM, Tuesday at 1:00 PM, . . . . Saturday at 10:00 PM, Saturday at 11:00 PM). In an example, the user device 102 may determine, based on the events 112, that thirty events occurred on Sunday at 12:00 AM, twenty events occurred on Sunday at 1:00 AM, ten events occurred on Sunday at 2:00 AM . . . one-hundred events occurred on Tuesday at 1:00 PM, . . . thirty events occurred on Saturday at 10:00 PM, and forty events occurred on Saturday at 11:00 PM.

In some aspects, the user device 102 (e.g., via the activity modelling instructions 108) the events 112 may occur over a span of several weeks, several months, or several years. In such aspects, the user device 102 may compute a mean event count (i.e., an average event count) for each day-hour combination. For example, if twenty events occurred on Tuesday at 1:00 PM during a first week of a month and sixty events occurred on Tuesday at 1:00 PM during a second week of the month, the user device 102 may compute a mean event count for Tuesday at 1:00 PM as (20+60)/2=40 events. As such, the time series data 126 may be in a day-hour format that includes a mean event count for each day-hour combination.

The user device 102 (e.g., via the activity modelling instructions 108) performs a smoothing operation on the time series data 126 to obtain/generate a curve 128. As used herein, the term "smoothing operation" may refer to creating an approximating function that attempts to capture patterns in the time series data 126 while leaving out noise and/or other fine-scale structures/rapid phenomena. A combination of the curve 128 and a baseline level of activity 130 of the user device 102 may be indicative of estimated active hours and estimated non-active hours of the user device 102 during each day of a week. In some aspects, performing the smoothing operation may include computing a moving average based on the time series data 126 (in a mean event count day-hour combination format as described above).

In an example with respect to the smoothing operation, the user device 102 (e.g., via the activity modelling instructions 108) may compute a mean number of events occurring over all day-hour combinations. In an example, if 16,800 events occur during a week and 168 day-hour combinations exist, the user device 102 may compute the mean number of events as 16,800/168=100. The user device 102 may then subtract the mean number of events from each mean event count for each day-hour combination to obtain a data point for each day-hour combination. Following the example above, if the mean event count for Tuesday at 1:00 PM is 200 events, the user device 102 may compute a data point for Tuesday at 1:00 PM as 200−100=100. In another example, if the mean event count for Wednesday at 1:00 AM is 10 events, the user device 102 may compute a data point for Wednesday at 1:00 AM as 10−100=−90. The user device 102 may then fit the curve 128 to each of the data points.

The user device 102 may establish the baseline level of activity 130 of the user device 102 based on the time series data 126 and/or the curve 128. In some aspects, the baseline level of activity 130 may be zero. In some other aspects, the baseline level of activity 130 may be set to a value above zero or below zero. In general, establishing the baseline level of activity 130 as a relatively high value may lead to relatively higher amounts of detections of unusual events and establishing the baseline level of activity 130 as a relatively low value may lead to relatively fewer amounts of detections of unusual events. Aspects of the curve 128 and the baseline level of activity 130 are described in greater detail below in the description of FIG. 2.

Subsequent to obtaining/generating the curve 128 and establishing the baseline level of activity 130 of the user device 102, the user device 102 may obtain a new event 132 (e.g., via the sensor application 110). The new event 132 may be in a format similar or identical to the first event 116 described above. For instance, the new event 132 includes/ indicates a day of the week 134 and a time 136. The new event 132 may also include/indicate an event identifier 138. The user device 102 (e.g., via the activity modelling instructions 108) may classify the new event 132 based on the day of the week 134, the time 136, the curve 128, and the baseline level of activity 130 as described below in the description of FIG. 2. In some aspects, the user device 102 may classify the new event 132 upon determining that the new event 132 satisfies some particular criteria (e.g., the new event 132 is of a particular type (e.g., data egress), a certain amount of data has been transferred, etc.).

Figure 2:
FIG. 2 is a diagram that illustrates time series data in a day-hour format in accordance with some aspects of the present disclosure.

FIG. 2 is a diagram 200 that illustrates time series data (e.g., the time series data 126) in a day-hour format in accordance with some aspects of the present disclosure. In the diagram 200, the x-axis of the time series data represents each day-hour combination (which may also be referred to as a weekday-hour combination). The y-axis of the time series data represents values of data points as described above in the description of FIG. 1.

Referring jointly now to FIG. 1 and FIG. 2, the user device 102 (e.g., via the activity modelling instructions 108) classifies the new event 132 based on the day of the week 134, the time 136, the curve 128, and the baseline level of activity 130. The user device 102 identifies a location on the x-axis of the time series data (e.g., the time series data 126) based on the day of the week 134 indicated by the new event 132. The user device 102 then identifies a point on the curve 128 corresponding to the location on the x-axis. For instance, each point on the curve 128 may have an x-coordinate and a y-coordinate, the user device 102 may identify an x-coordinate on the curve 128 that corresponds to the day of the week 134 and the time 136 (i.e., that corresponds to the day-hour combination of the new event 132), and the user device 102 may obtain the y-coordinate on the curve 128 based on the x-coordinate. The user device 102 then determines whether the point on the curve 128 is above, below, or on the baseline level of activity 130. In the example depicted in the diagram 200, the baseline level of activity 130 is zero (although other possibilities may be contemplated). If the point on the curve 128 is above the baseline level of activity 130, the user device 102 may classify the new event 132 as usual (i.e., within normal working hours of the user 103). For instance, if a point on the curve 128 corresponding to Monday at 1:00 PM is above the baseline level of activity 130, the user device 102 may classify the new event 132 as usual. If the point on the curve 128 is at or below the baseline level of activity 130, the user device 102 may classify the new event 132 as unusual (i.e., not within normal working hours of the user 103). For instance, if a point on the curve 128 corresponding to Monday at 1:00 AM is at or below the baseline level of activity 130, the user device 102 may classify the new event 132 as unusual.

The user device 102 (e.g., via the activity modelling instructions 108) may output an indication of the classification of the new event 132, that is, the user device 102 may output an indication as to whether the new event 132 is usual or unusual. For instance, the user device 102 may store the indication in the memory 106, transmit the indication over the network 114, etc.

In some aspects, the user device 102 may transmit an annotation indication 140 to a computing device 142 operated by an analyst 144 over the network 114. In an example, the computing device 142 may be or include the computer system 600 (or a portion thereof). The annotation indication 140 may include the classification of the new event 132. The computing device 142 may then present the annotation indication 140 to the analyst 144 (e.g., on a display). In an example, the analyst 144 may further investigate the user device 102 to ascertain whether unauthorized data egress occurred.

The technologies described herein may be applicable to other contexts beyond data egress. For instance, the technologies described herein may be applicable to other security domains such as identity protection, insider risk, etc. Due to the aforementioned aggregation and smoothing on available historical data (e.g., not for a named time period), the technologies described herein maintain a level of privacy for the user 103 (e.g., an employee). For instance, a cybersecurity data egress model described herein (e.g., as implemented by the activity modelling instructions 108) may enable determination of whether a certain behavior occurs inside or outside of typical activity hours without enabling a determination about productivity or overall working hours of a specific employee (e.g., the user 103).

In some aspects described herein, a volume of sensor events (e.g., the events 112) may be used as a proxy for user activity. The sensor events may be aggregated into a weekday-hour format. A statistical time series model is applied to establish on/off hour times on an agent basis (e.g., on a user device basis). The statistical time series model may be used to estimate if anomalous behavior occurs, but may not be used as a productivity measurement due to an estimated "smoothed" measure of online activity, thereby maintaining employee privacy. Behaviors of interests in the context of data security are contextualized with baseline on/off hour times. Individual hourly behaviors of an employee (e.g., the user 103) may not be revealed to an analyst.

In some aspects described herein, a model (e.g., a model implemented by the activity modelling instructions 108) may estimate an activity level of a device (e.g., the user device 102) for each weekday-hour (Monday-Sunday and 0h-23h) combination. The model may estimate user activity of a user (e.g., the user 103) based on historic activity for each weekday-hour, as well as historic activity of adjacent weekday-hours (e.g., via smoothing). The inclusion of historic activity of adjacent weekday-hours may enable determination of which parts of the week are "usual" versus excluding adjacent weekday-hour activity in estimates. In an example, if a device (e.g., the user device 102) is not normally active on Mondays between 1:00 PM and 2:00 PM due to a user taking a lunch break, the model may likely not determine file egress behavior during this weekday-hour to be "unusual" activity.

In some aspects described herein, the estimated hour curve (e.g., the curve 128) may be shifted according to geolocation changes of the user device 102 and custom configurable parameters. For example, if the user device 102 is determined to be in a new time zone with a difference of two hours, the estimated hour curve may be shifted by two hours to account for the new time zone.

In some aspects described herein, the model may be trained using historically available data for each device to generate the time series data 126, the curve 128, and/or the baseline level of activity 130. If an amount of historical data for the user device 102 is below a threshold amount, a fallback curve may be estimated which is an aggregation of activity of devices that are similar to the user device 102 (e.g., devices associated with users occupying a similar role as the user 103). The similar devices may be identified by calculating a similarity between historical activity of a new device (even if very little data exists) and/or a similarity in geolocation. The fallback curve may be used until sufficient historical data is available for training for the user device 102. In an example, a new device (e.g., the user device 102) is issued to a user (e.g., an employee such as the user 103). The initial curve may be calculated from activity of devices with activity similar to the first week's activity and that are close to a geolocation of the new device. Later, when the new device has been active for several weeks, activity may be estimated using device activity alone (e.g., using the processes described herein).

In some aspects described herein, model training and retraining (e.g., obtaining the events 112, generating the time series data 126, generating the curve 128, and/or establishing the baseline level of activity 130) may be performed regularly to adjust for changes in activity of the user device 102. However, if there is a period of absence of the user 103 of the user device 102 in the training data (e.g., due to a vacation of the user 103), the model may be biased. Therefore, periods from a training period of the user device 102 may be excluded if such periods are anomalous and are not a true representation of behavior of the user device 102. In an example, the user 103 may go on vacation for a week and as a result, overall user activity for the user device 102 may be unusually low. The estimated hour curve (e.g., the curve 128) of the user 103 may not be updated with data from this period, as such data is anomalous.

In some aspects described herein, a severity score may be estimated in order to allow an organization to configure a level of "unusualness" that would lead to a detection of unusual behavior of the user device 102. For example, the organization may be interested in detecting behaviors that are far from "usual" working hours.

In some aspects described herein, a given weekday-hour is "usual" for a device/user when aggregated activity for the weekday-hour is above a baseline for the device/user. A baseline may be calculated from an aggregation of all weekday-hour activity estimates. The baseline may not be exposed in order to facilitate user privacy. For example, if the technologies described herein determine that a user is active outside of their "usual" activity hours, the technologies described herein may raise a detection without indicating how frequently the user is active in general.

FIG. 3 is a flow diagram 300 of a method for sensor event based activity hour modelling in accordance with some aspects of the present disclosure. The method may be performed by processing logic that may include hardware (e.g., a processing device), software (e.g., instructions running/executing on a processing device), firmware (e.g., microcode), or a combination thereof. In some aspects, at least a portion of the method may be performed by the user device 102 (shown in FIG. 1), the processing device 104 (shown in FIG. 1), the computing system/user device 502 (shown in FIG. 5), the processing device 504 (shown in FIG. 5), the computer system 600 (shown in FIG. 6), the processing device 602 (shown in FIG. 6), or a combination thereof.

The method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

At block 302, a processing device obtains, via a sensor application installed on a user device, a plurality of events occurring on the user device, where each event in the plurality of events indicates a respective day and a respective time. In an example, the sensor application may be or include the sensor application 110, the user device may be or include the user device 102, the plurality of events may be or include the events 112, and the respective day and the respective time may correspond to the day of the week 118 and the time 120. In another example, the sensor application may be or include the sensor application 510, the user device may be or include the computing system/user device 502, the plurality of events may be or include the plurality of events 512, the respective day may be or include the respective day 514, and the respective time may be or include the respective time 516.

At block 304, the processing device aggregates, based on the respective day and the respective time, the plurality of events to generate time series data. In an example, the time series data may be or include the time series data 126. In another example, the time series data may be or include the time series data depicted in FIG. 2. In yet another example, the time series data may be or include the time series data 518.

At block 306, the processing device performs a smoothing operation on the time series data to generate a curve. In an example, the smoothing operation may correspond to the smoothing operation described above in the description of FIG. 1 and the curve may be or include the curve 128. In another example, the smoothing operation may be or include the smoothing operation 520 and the curve may be or include the curve 522.

At block 308, the processing device classifies an event on the user device as usual or unusual based on a baseline level of activity on the user device and the curve. In an example, the event may be or include the new event 132 and the baseline level of activity may be or include the baseline level of activity 130. In another example, the event may be or include the event 526 and the baseline level of activity may be or include the baseline level of activity 524.

FIG. 4 is a flow diagram 400 of a method for sensor event based activity hour modelling in accordance with some aspects of the present disclosure. The method may be performed by processing logic that may include hardware (e.g., a processing device), software (e.g., instructions running/executing on a processing device), firmware (e.g., microcode), or a combination thereof. In some aspects, at least a portion of the method may be performed by the user device 102 (shown in FIG. 1), the processing device 104 (shown in FIG. 1), the computing system/user device 502 (shown in FIG. 5), the processing device 504 (shown in FIG. 5), the computer system 600 (shown in FIG. 6), the processing device 602 (shown in FIG. 6), or a combination thereof.

The method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

At block 402, a processing device obtains, via a sensor application installed on a user device, a plurality of events occurring on the user device, where each event in the plurality of events indicates a respective day and a respective time. In an example, the sensor application may be or include the sensor application 110, the user device may be or include the user device 102, the plurality of events may be or include the events 112, and the respective day and the respective time may correspond to the day of the week 118 and the time 120. In another example, the sensor application may be or include the sensor application 510, the user device may be or include the computing system/user device 502, the plurality of events may be or include the plurality of events 512, the respective day may be or include the respective day 514, and the respective time may be or include the respective time 516.

In some aspects, at block 404, the processing device may determine that a number of a subset of events in the plurality of events is below a threshold number of events for a time period. For example, the aforementioned aspect may correspond to the description of FIG. 1 above.

In some aspects, at block 406, the processing device may remove the subset of events from the plurality of events prior to aggregating the plurality of events. For example, the aforementioned aspect may correspond to the description of FIG. 1 above.

At block 408, the processing device aggregates, based on the respective day and the respective time, the plurality of events to generate time series data. n an example, the time series data may be or include the time series data 126. In another example, the time series data may be or include the time series data depicted in FIG. 2. In yet another example, the time series data may be or include the time series data 518.

At block 410, the processing device performs a smoothing operation on the time series data to generate a curve. In an example, the smoothing operation may correspond to the smoothing operation described above in the description of FIG. 1 and the curve may be or include the curve 128. In another example, the smoothing operation may be or include the smoothing operation 520 and the curve may be or include the curve 522.

In some aspects, at block 412, the processing device may establish a baseline level of activity on the user device based on at least one of the time series data or the curve. In an example, the baseline level of activity may be or include the baseline level of activity 130. In another example, the baseline level of activity may be or include the baseline level of activity 524.

In some aspects, at block 414, the processing device may determine a change of a time zone of the user device. For example, the aforementioned aspect may correspond to the description of FIG. 1 above.

In some aspects, at block 416, the processing device may adjust the curve based on the change of the time zone, where classifying the event on the user device may be based on the adjusted curve. For example, the aforementioned aspect may correspond to the description of FIG. 1 above.

In some aspects, at block 418, the processing device may identify, via the sensor application, an event on the user device. Classifying the event may occur subsequent to the identification of the event. In an example, the event may be or include the new event 132. In another example, the event may be or include the event 526.

At block 420, the processing device classifies the event on the user device as usual or unusual based on a baseline level of activity on the user device and the curve. In an example, the event may be or include the new event 132 and the baseline level of activity may be or include the baseline level of activity 130. In another example, the event may be or include the event 526 and the baseline level of activity may be or include the baseline level of activity 524.

In some aspects, at block 422, the processing device may output an indication of the classification of the event to a computing device. For example, the indication may be or include the annotation indication 140 and the computing device may be or include the computing device 142.

In some aspects, the time series data may be in a day-hour format in which a number of events is recorded for each hour of each day. For example, the time series data 126 may be in a day-hour format in which a number of events is recorded for each hour of each day. In another example, the time series data 518 may be in a day-hour format in which a number of events is recorded for each hour of each day In some aspects, performing the smoothing operation on the time series data may include performing the smoothing operation on a data point in the time series data, and performing the smoothing operation on the data point may include performing the smoothing operation based on adjacent data points of the data point. For example, the aforementioned aspect may correspond to the description of FIG. 1 and FIG. 2 above.

In some aspects, the event may include a data egress event. In an example, the new event 132 and/or the event 526 may be or include a data egress event.

In some aspects, performing the smoothing operation on the time series data may include computing a moving average for the time series data, and classifying the event as usual or unusual may be based on the moving average and the baseline level of activity. For example, the aforementioned aspect may correspond to the description of FIG. 1 and FIG. 2 above.

In some aspects, a combination of the curve and the baseline level of activity may be indicative of estimated active hours and estimated non-active hours of the user device during each day of a week. For example, the aforementioned aspect may correspond to the description of FIG. 1 and FIG. 2 above.

In some aspects, the plurality of events may be obtained from a time period starting from an activation of the user device. For example, the aforementioned aspect may correspond to the description of FIG. 1 and FIG. 2 above.

FIG. 5 is a block diagram 500 that illustrates an example of a computing system/user device 502 for sensor event based activity hour modelling in accordance with some aspects of the present disclosure. In some aspects, the computing system/user device 502 may perform some or all of the functionality described herein. The computing system/user device 502 includes a processing device 504 and memory 506. The memory 506 stores instructions 508 that are executed by the processing device 504. The instructions 508, when executed by the processing device 504, cause the processing device 504 to obtain, via a sensor application 510 installed on a user device (i.e., the computing system/user device 502), a plurality of events 512 occurring on the user device (i.e., the computing system/user device 502), where each event in the plurality of events 512 indicates a respective day 514 and a respective time 516. The instructions 508, when executed by the processing device 504, cause the processing device 504 to aggregate, based on the respective day 514 and the respective time 516, the plurality of events 512 to generate time series data 518. The instructions 508, when executed by the processing device 504, cause the processing device 504 to perform a smoothing operation 520 on the time series data 518 to generate a curve 522. The instructions 508, when executed by the processing device 504, cause the processing device 504 to classify an event 526 on the user device (i.e., the computing system/user device 502) as usual or unusual based on a baseline level of activity 524 on the user device (i.e., the computing system/user device 502) and the curve 522.

Figure 6:
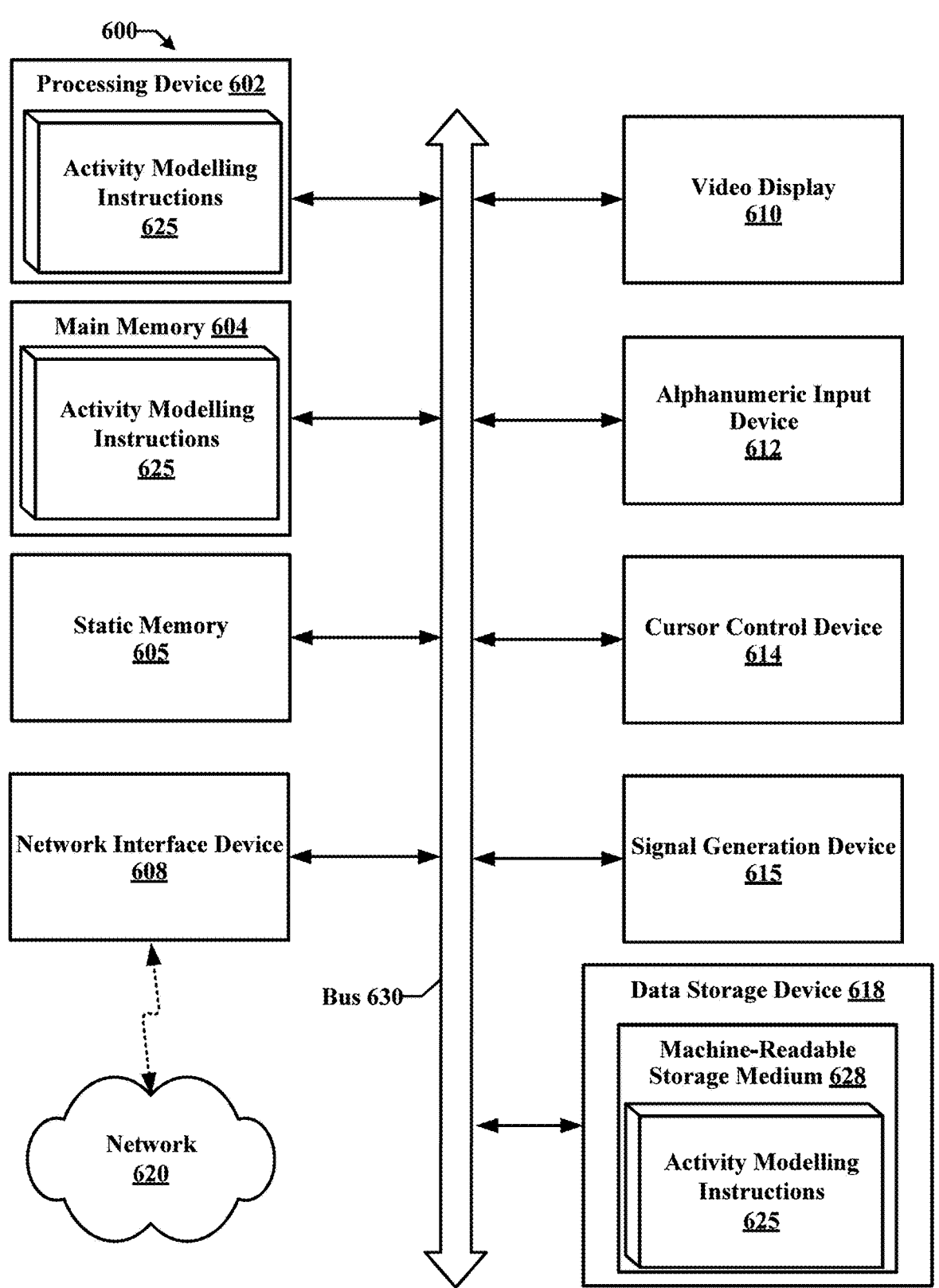
FIG. 6 illustrates a diagrammatic representation of a machine in an example form of a computer system that may perform one or more of the operations described herein in accordance with some aspects of the present disclosure.

FIG. 6 illustrates a diagrammatic representation of a machine in the example form of a computer system 600 within which a set of instructions, for causing the machine to perform any one or more of the methodologies discussed herein for sensor event based activity hour modelling.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, the computer system 600 may be representative of a server.

The computer system 600 includes a processing device 602, a main memory 604 (e.g., read-only memory (ROM), flash memory, dynamic random access memory (DRAM), a static memory 605 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

The computer system 600 may further include a network interface device 608 which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 615 (e.g., an acoustic signal generation device, such as a speaker). In some embodiments, the video display unit 610, the alphanumeric input device 612, and the cursor control device 614 may be combined into a single component or device (e.g., an LCD touch screen).

The processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute activity modelling instructions 625, for performing the operations and steps discussed herein. For example, the activity modelling instructions 625 may include instructions for obtaining, via a sensor application installed on a user device, a plurality of events occurring on the user device, where each event in the plurality of events indicates a respective day and a respective time. The activity modelling instructions 625 may include instructions for aggregating, based on the respective day and the respective time, the plurality of events to generate time series data. The activity modelling instructions 625 may include instructions for performing a smoothing operation on the time series data to generate a curve. The activity modelling instructions 625 may include instructions for classifying an event on the user device as usual or unusual based on a baseline level of activity on the user device and the curve.

The data storage device 618 may include a machine-readable storage medium 628 that stores the activity modelling instructions 625 (e.g., software) embodying any one or more of the methodologies of functions described herein. The activity modelling instructions 625 may also reside, completely or at least partially, within the main memory 604 or within the processing device 602 during execution thereof by the computer system 600; the main memory 604 and the processing device 602 also constituting machine-readable storage media. The activity modelling instructions 625 may further be transmitted or received over a network 620 via the network interface device 608.

While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "obtaining," "aggregating," "performing," "smoothing," "classifying," "establishing," "outputting," "inputting," "transmitting," "receiving," "computing," "calculating," "estimating," "identifying," "adjusting," "determining," "removing," "adding," "training," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission, or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method, comprising:
obtaining, via a sensor application installed on a user device, a plurality of events occurring on the user device, wherein each event in the plurality of events indicates a respective day and a respective time;
aggregating, based on the respective day and the respective time, the plurality of events to generate time series data;
performing a smoothing operation on the time series data to generate a curve, wherein the curve comprises a plurality of data points, and wherein a data point in the plurality of data points is based on a difference between a mean event count for a day and a time and a mean event count for the user device for a plurality of weeks, the mean event count for the day and the time and the mean event count for the user device for the plurality of weeks being based on events created by the sensor application installed on the user device;
obtaining, via the sensor application, a new event that occurs on the user device after the plurality of events occur on the user device, wherein the new event comprises a first date and a first time, and wherein the new event comprises a data egress event;
classifying, by a processing device, the new event on the user device as usual or unusual based on a baseline level of activity on the user device, the curve, and the first date and the first time of the new event; and
transmitting, to an analyst device, an indication that the new event is unusual based on the classification of the new event.

2. The method of claim 1, wherein the time series data is in a day-hour format in which a number of events is recorded for each hour of each day.

3. The method of claim 1, wherein the performing the smoothing operation on the time series data comprises performing the smoothing operation on a first data point in the time series data, and wherein the performing the smoothing operation on the data point comprises performing the smoothing operation based on adjacent data points of the first data point.

4. The method of claim 1, further comprising:
establishing the baseline level of activity on the user device based on at least one of the time series data or the curve.

5. The method of claim 1, further comprising:
outputting an indication of the classification of the new event.

6. The method of claim 1, wherein the plurality of events is associated with working hours and non-working hours of a user.

7. The method of claim 1, wherein the performing the smoothing operation on the time series data comprises computing a moving average for the time series data, and wherein the classifying the new event as usual or unusual is based on the moving average and the baseline level of activity.

8. The method of claim 1, wherein a combination of the curve and the baseline level of activity are indicative of estimated active hours and estimated non-active hours of the user device during each day of a week.

9. The method of claim 1, wherein the new event is associated with cybersecurity.

10. The method of claim 1, further comprising:
determining a change of a time zone of the user device; and
adjusting the curve based on the change of the time zone, wherein the classifying the new event on the user device is based on the adjusted curve.

11. The method of claim 1, wherein the plurality of events is obtained from a time period starting from an activation of the user device.

12. The method of claim 1, further comprising:
determining that a number of a subset of events in the plurality of events is below a threshold number of events for a time period; and
removing the subset of events from the plurality of events prior to aggregating the plurality of events.

13. A system, comprising:
a memory; and
a processing device operatively coupled to the memory, to:
obtain, via a sensor application installed on a user device, a plurality of events occurring on the user device, wherein each event in the plurality of events indicates a respective day and a respective time;
aggregate, based on the respective day and the respective time, the plurality of events to generate time series data;
perform a smoothing operation on the time series data to generate a curve, wherein the curve comprises a plurality of data points, and wherein a data point in the plurality of data points is based on a difference between a mean event count for a day and a time and a mean event count for the user device for a plurality of weeks, the mean event count for the day and the time and the mean event count for the user device for the plurality of weeks being based on events created by the sensor application installed on the user device;
obtain, via the sensor application, a new event that occurs on the user device after the plurality of events occur on the user device, wherein the new event comprises a first date and a first time, and wherein the new event comprises a data egress event;

classify the new event on the user device as usual or unusual based on a baseline level of activity on the user device, the curve, and the first date and the first time of the new event; and transmit, to an analyst device, an indication that the new event is unusual based on the classification of the new event.

14. The system of claim 13, wherein the time series data is in a day-hour format in which a number of events is recorded for each hour of each day.

15. The system of claim 13, wherein the plurality of events is associated with working hours and non-working hours of a user.

16. The system of claim 13, wherein a combination of the curve and the baseline level of activity are indicative of estimated active hours and estimated non-active hours of the user device during each day of a week.

17. A non-transitory computer readable medium, having instructions stored thereon which, when executed by a processing device, cause the processing device to:

obtain, via a sensor application installed on a user device, a plurality of events occurring on the user device, wherein each event in the plurality of events indicates a respective day and a respective time;

aggregate, based on the respective day and the respective time, the plurality of events to generate time series data;

perform a smoothing operation on the time series data to generate a curve, wherein the curve comprises a plurality of data points, and wherein a data point in the plurality of data points is based on a difference between a mean event count for a day and a time and a mean event count for the user device for a plurality of weeks, the mean event count for the day and the time and the mean event count for the user device for the plurality of weeks being based on events created by the sensor application installed on the user device;

obtaining, via the sensor application, a new event that occurs on the user device after the plurality of events occur on the user device, wherein the new event comprises a first date and a first time, and wherein the new event comprises a data egress event;

classify, by the processing device, the new event on the user device as usual or unusual based on a baseline level of activity on the user device, the curve, and the first date and the first time of the new event; and transmit, to an analyst device, an indication that the new event is unusual based on the classification of the new event.

18. The non-transitory computer readable medium of claim 17, wherein the time series data is in a day-hour format in which a number of events is recorded for each hour of each day.

19. The non-transitory computer readable medium of claim 17, wherein the plurality of events are associated with working hours and non-working hours of a user.

20. The non-transitory computer readable medium of claim 17, wherein a combination of the curve and the baseline level of activity are indicative of estimated active hours and estimated non-active hours of the user device during each day of a week.

* * * * *